(12) United States Patent
Trowbridge (10) Patent No.: US 6,504,280 B2
(45) Date of Patent: Jan. 7, 2003

(54) ADJUSTABLE ATTACHMENT ALTERNATOR

(76) Inventor: Lawrence G. Trowbridge, 812 Fort Salonga Rd., Northport, NY (US) 11768

( * ) Notice: Subject to any disclaimer, the term of this patent is extended or adjusted under 35 U.S.C. 154(b) by 0 days.

(21) Appl. No.: 09/796,290

(22) Filed: Feb. 28, 2001

(65) Prior Publication Data

US 2002/0117920 A1 Aug. 29, 2002

(51) Int. Cl.$^7$ ............................................... H02K 5/00
(52) U.S. Cl. ........................................ 310/91; 310/89
(58) Field of Search ............................. 310/89, 91, 42; 29/596–598; 248/645, 666, 675, 667, 205.1, 241

(56) References Cited

U.S. PATENT DOCUMENTS

| | | | | |
|---|---|---|---|---|
| 4,835,428 A | * | 5/1989 | Komurasaki et al. | ......... 310/89 |
| 4,945,272 A | * | 7/1990 | Ochi et al. | ..................... 310/91 |
| 5,760,513 A | | 6/1998 | Morishita et al. | ............. 310/91 |
| 5,914,549 A | * | 6/1999 | Adachi et al. | ................. 310/89 |

* cited by examiner

*Primary Examiner*—Tran Nguyen

(57) ABSTRACT

An adjustable attachment alternator for motor vehicles is comprised of a rotor, a stator, a stator housing for clamping a stator between two end frames, and a variety of separately formed mounting ears for securing the alternator to an engine. To secure the alternator to a particular engine the alternator is configured by attaching particular mounting ears to particular locations on the periphery of the housing end frames by means of fasteners. The housing end frames have a plurality of frame attachment holes to accommodate the mating of the various mounting ears. The variety of mounting ears having one or more mounting ear holes for securing the alternator to an engine, also have a plurality of mounting ear attachment holes for attachment to the periphery of the end frames by means of fasteners. With separately formed mounting ears, an alternator's configuration is completed in the final assembly operation when mounting ears are attached. A relatively easy change in the final assembly operation results in a new alternator configuration, which can reduce costs. Providing an alpha/numeric identification system on the components can facilitate final assembly.

1 Claim, 8 Drawing Sheets

ADJUSTABLE ATTACHMENT ALTERNATOR

BACKGROUND OF THE INVENTION

1. Field of Invention

The present invention relates generally to alternators for motor vehicles. More specifically, the invention relates to the interchangeability of mounting structures and the method of assembling alternators for installation in a variety of motor vehicles.

2. Description of Prior Art

The general purpose of alternators mounted to an engine in motor vehicles is to generate electricity and recharge the battery. Unlike automotive parts such as spark plugs and batteries, alternator mounting structure configurations vary greatly among the hundreds of conventional alternators. Conventional alternators encase the stator, rotor and other electronic and mechanical components in a housing. The housing is comprised of a front end frame and a back end frame which, when clamped together, encase and support the components. Conventional alternator housing end frames are integrally formed with one or more mounting ears including mounting holes, varying in diameter and sometimes tapped to accept threaded bolts, for securing the alternator to an engine. Alternator mounting ears integrally formed on the housing end frames are specifically designed and specifically located for mounting to an engine in a particular make and model of vehicle. This alternator diversity of mounting ear configuration and location considerably diminishes alternator interchangeability between the various makes and models of vehicles and can increase inventory costs.

Although prior art alternators, as above referenced, may be suitable for the particular purpose for which they were intended, they would not be as suitable for the purposes of the present invention as herein described.

BRIEF SUMMARY OF THE INVENTION

Whereas a conventional alternator housing consists of a front end frame and a back end frame, usually aluminum castings, and having each frame and its mounting ears integrally formed as a single casting, the present invention consists of a front end frame and a back end frame having a variety of separately formed, attachable, detachable and adjustable mounting ears:

A primary object of the present invention is to provide a vehicle alternator that will improve upon the prior art devices.

Another object of the present invention is to provide a vehicle alternator having mounting ear attachments enabling the alternator to be configured for installation into a wide variety of motor vehicles.

An additional object of the present invention is to provide an interchangeable vehicle alternator that can be simple to install in the various motor vehicle environments.

A further object of the present invention is to provide a vehicle alternator in which the mounting ears can be easily adjusted for installation into various makes and models of motor vehicles.

A still further object of the present invention is to provide a high quality vehicle alternator that is economical in cost to manufacture and reduces inventory costs.

Further objects of the present invention and its attendant features, advantages and benefits will become more apparent in the following description of the invention and the accompanying drawings.

To accomplish the above and related objects, this invention may be embodied in the form illustrated in the appended drawings. However, the drawings are illustrative and may be changed in the specific construction illustrated and described within the scope of the appended claims.

DESCRIPTION OF THE PREFERRED EMBODIMENT

In the following drawing figures, the same reference numerals are used to identify similar elements of the various views.

With reference to FIGS. 1, 2, 3 and 4 of the prior art, conventional vehicle alternator housings, usually formed by aluminum die casting, are shown comprised of a front end frame 1 and a back end frame 2. One or both frames are shown having integrally formed mounting ears 3 and mounting holes 4 for securing the alternator to a not shown vehicle engine.

Figure 1:
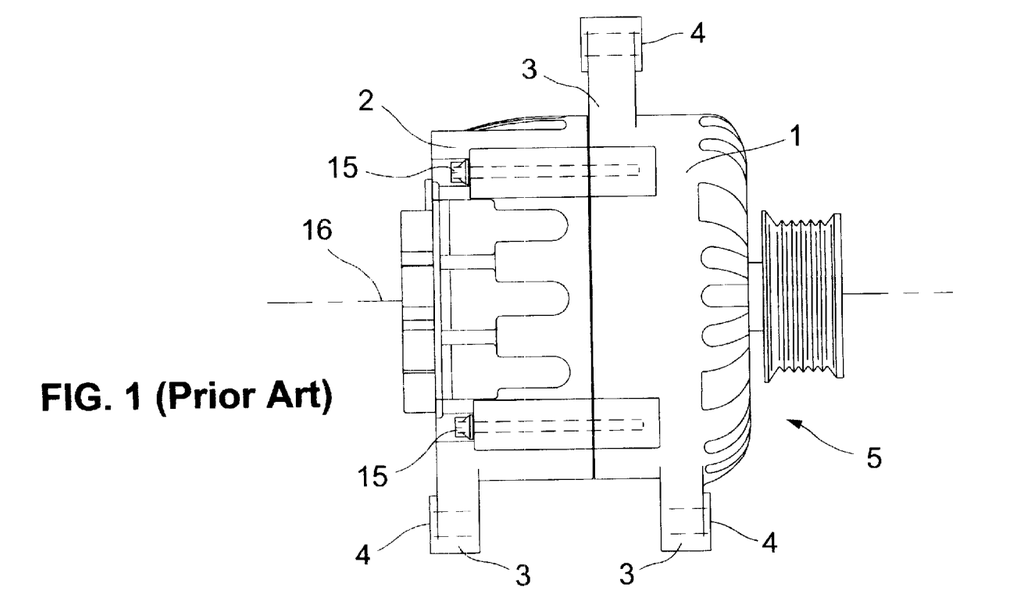
FIG. 1 is a side view of the prior art, showing a conventional alternator housing having integrally formed mounting ears and mounting holes.

Referring to FIG. 1 of the prior art, the left side view 5 of a conventional alternator housing shows the front end frame 1 and the back end frame 2 clamped together by means of through bolts 15 in parallel to the axis 16 of the alternator.

The front end frame 1 is shown as a conventional casting having two integrally formed mounting ears 3 and two mounting holes 4. The back end frame 2 is shown as a conventional casting having one integrally formed mounting ear 3 with one mounting hole 4.

Figure 2:
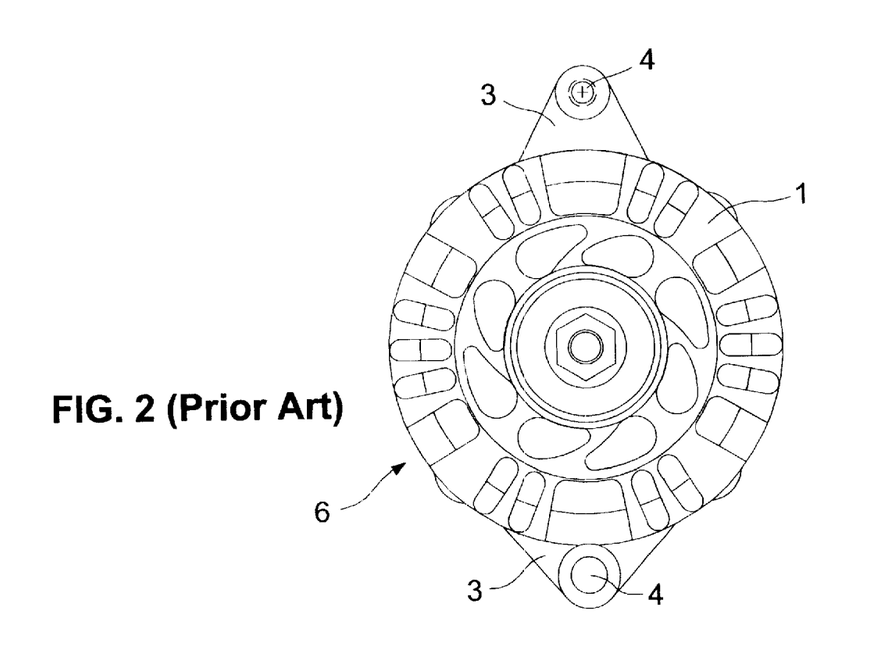
FIG. 2 is the front view of the prior art shown in FIG. 1.

Referring to FIG. 2 of the prior art, the front view 6 of the conventional alternator housing shown in FIG. 1 shows the two mounting ears 3 and the two mounting holes 4 of the front end frame 1. The top mounting hole 4 is shown having a smaller hole diameter than the bottom mounting hole 4. The top mounting hole 4 is also shown tapped to accept a threaded fastener (not shown).

Figure 3:
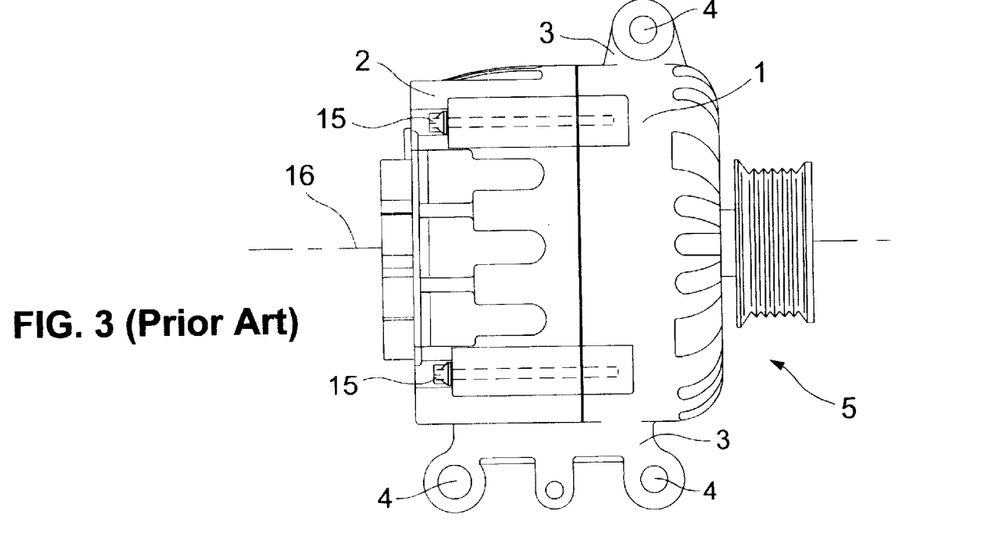
FIG. 3 is a side view of the prior art, showing a different conventional alternator housing having integrally formed side mounting ears and mounting holes.

Referring to FIG. 3 of the prior art, the left side view 5 of a different conventional alternator housing shows the front end frame 1 and the back end frame 2 clamped together by means of through bolts 15. The front end frame 1 is shown as a conventional single casting having two integrally formed side mounting ears 3 and three mounting holes 4. The two bottom mounting holes 4 of the left side view 5 are shown having dissimilar diameters. The larger diameter, rear bottom mounting hole 4 is shown positioned beneath the back end frame 2. The back end frame 2 casting is shown having neither mounting ears 3 nor mounting holes 4.

Figure 4:
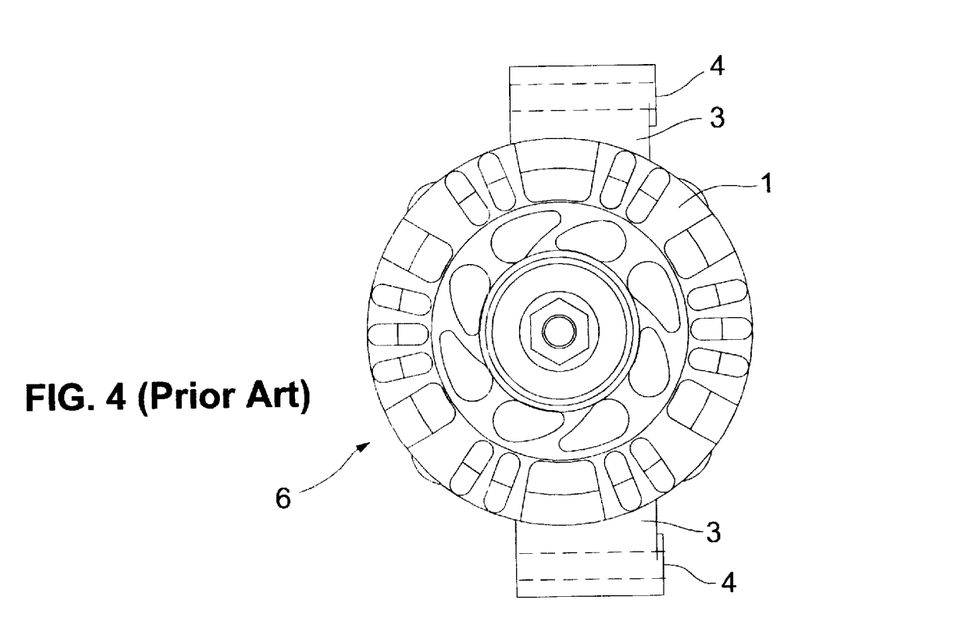
FIG. 4 is the front view of the prior art shown in FIG. 3.

Referring to FIG. 4 of the prior art, the front view 6 of the conventional alternator housing shown in FIG. 3 shows the two mounting ears 3 and two of the three mounting holes 4.

Referring now to FIGS. 5, 7, 8, 9, 10 and 12 of the present invention, the front end frame 1 and the back end frame 2 are shown clamped together by means of through bolts 15. Various mounting ears 3 are shown unattached and not as yet integral components of the alternator's end frames 1 and 2. The assembled end frames 1 and 2 are shown having a plurality of frame attachment holes 8. The mounting ears 3 are shown having one or more mounting holes 4, varying in diameter, for securing the alternator to a not shown vehicle engine. Some mounting holes 4 may also be tapped to accept threaded fasteners (not shown) as best shown in the top mounting ear 3 in FIG. 9. The mounting ears 3 are also shown having a plurality of mounting ear attachment holes 10 for securing the mounting ears 3 to the assembled end frames 1 and 2.

Figure 5:
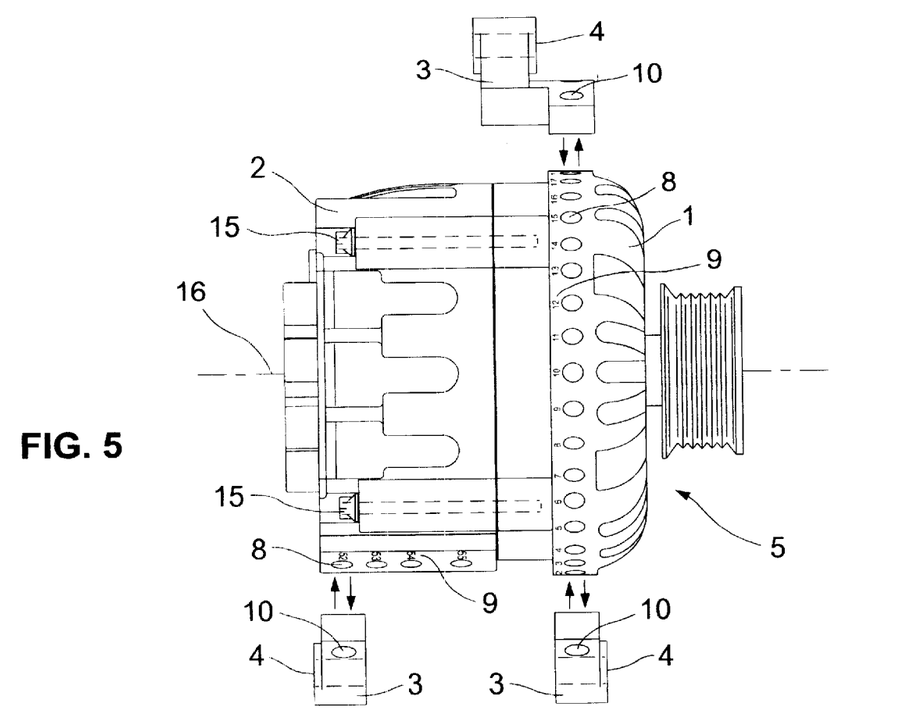
FIG. 5 is a side view of the present invention, showing separately formed mounting ears before attachment to the alternator housing frames.
Figure 6:
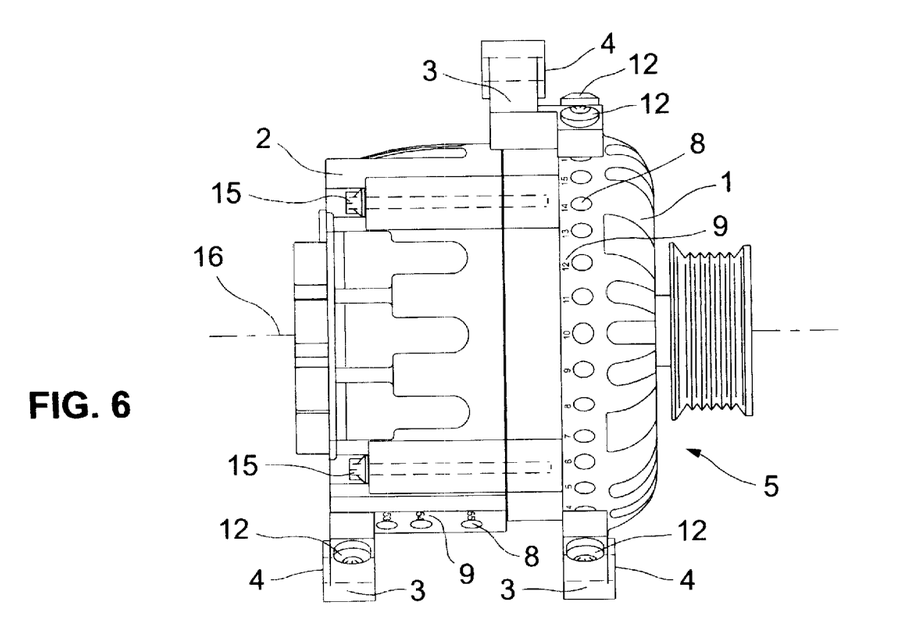
FIG. 6 is a side view of the present invention shown in FIG. 5, showing the mounting ears attached to the alternator housing frames by means of fasteners.
Figure 7:
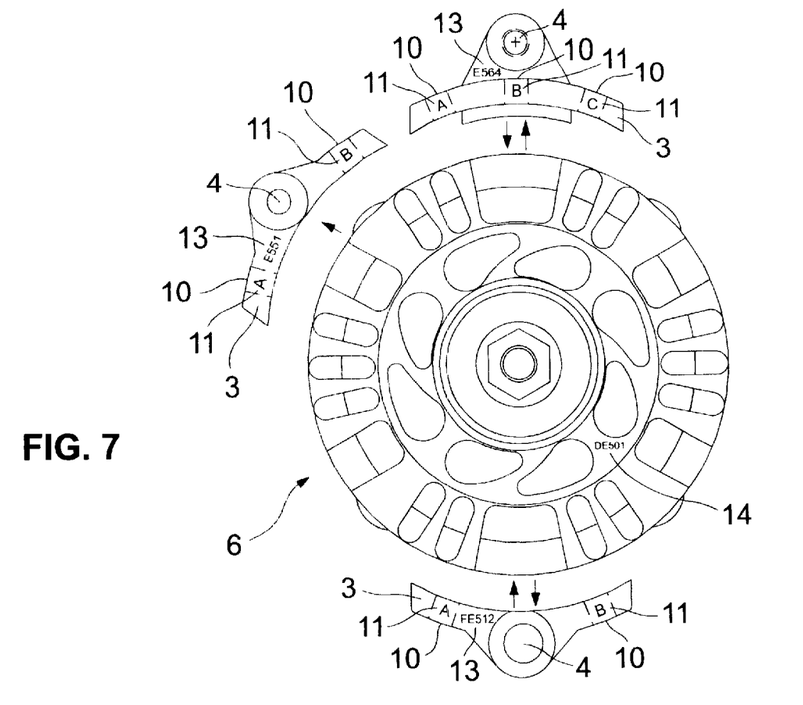
FIG. 7 is a front view of the present invention, showing three separately formed mounting ears before attachment to the alternator's front end frame.
Figure 10:
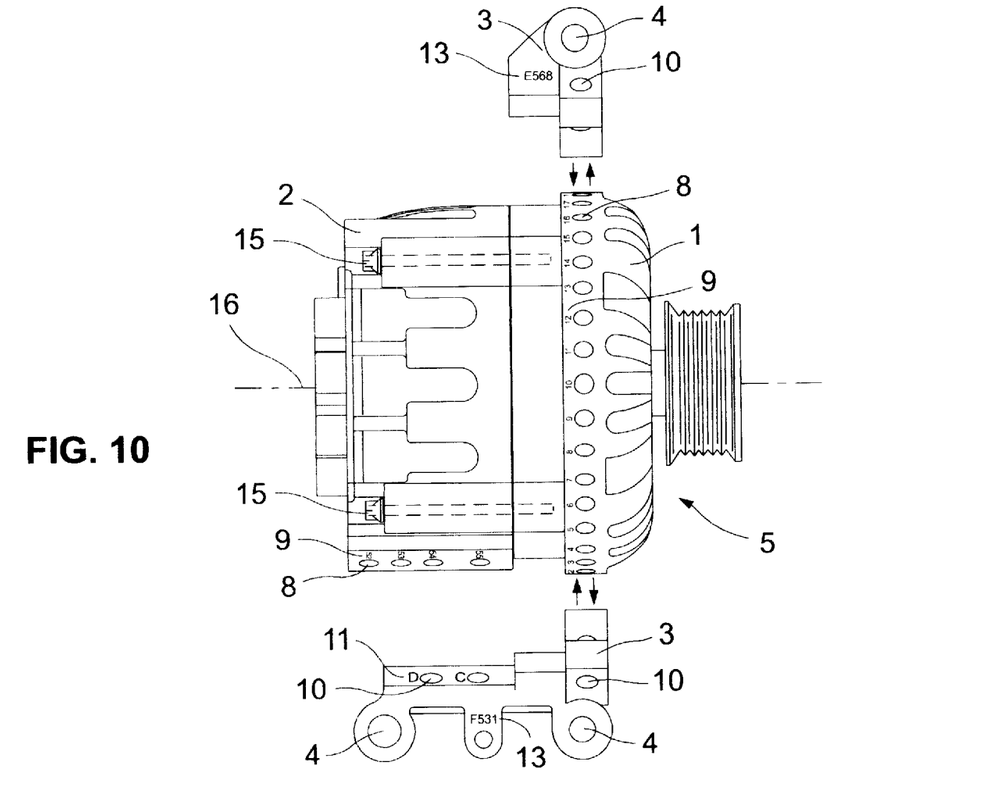
FIG. 10 is a side view of the present invention, showing separately formed side mounting ears before attachment to the alternator housing frames.
Figure 11:
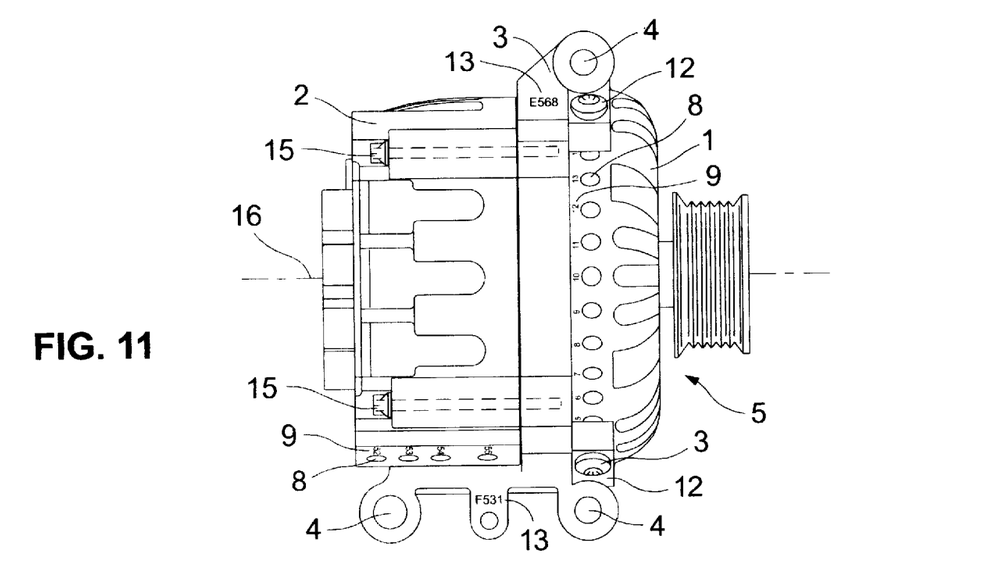
FIG. 11 is a side view of the present invention, showing the side mounting ears attached to the alternator housing frames.
Figure 12:
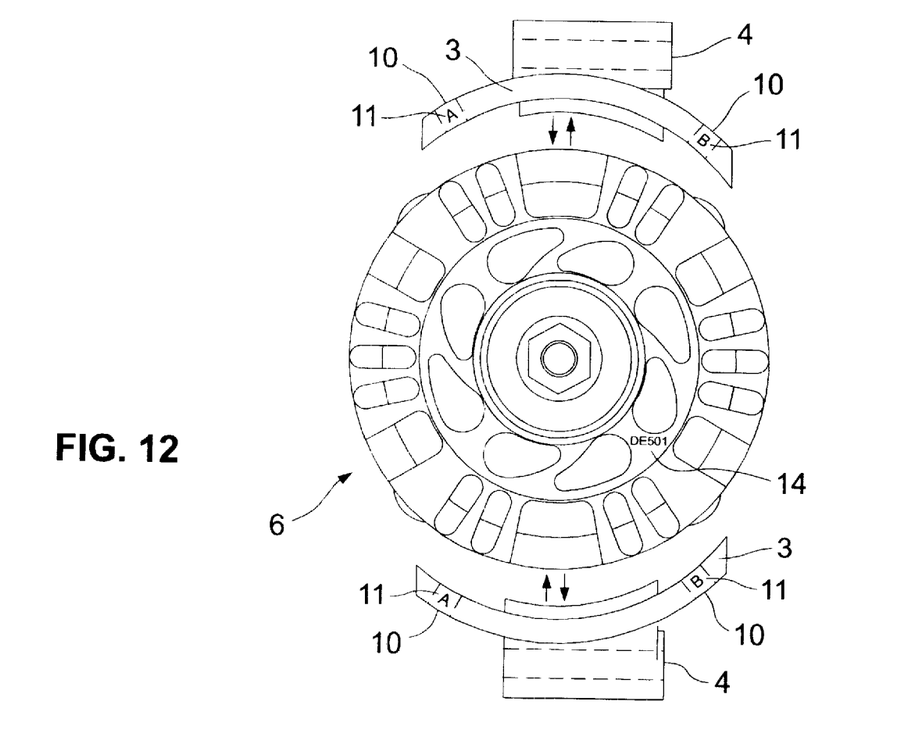
FIG. 12 is the front view of the present invention shown in FIG. 10.
Figure 14:
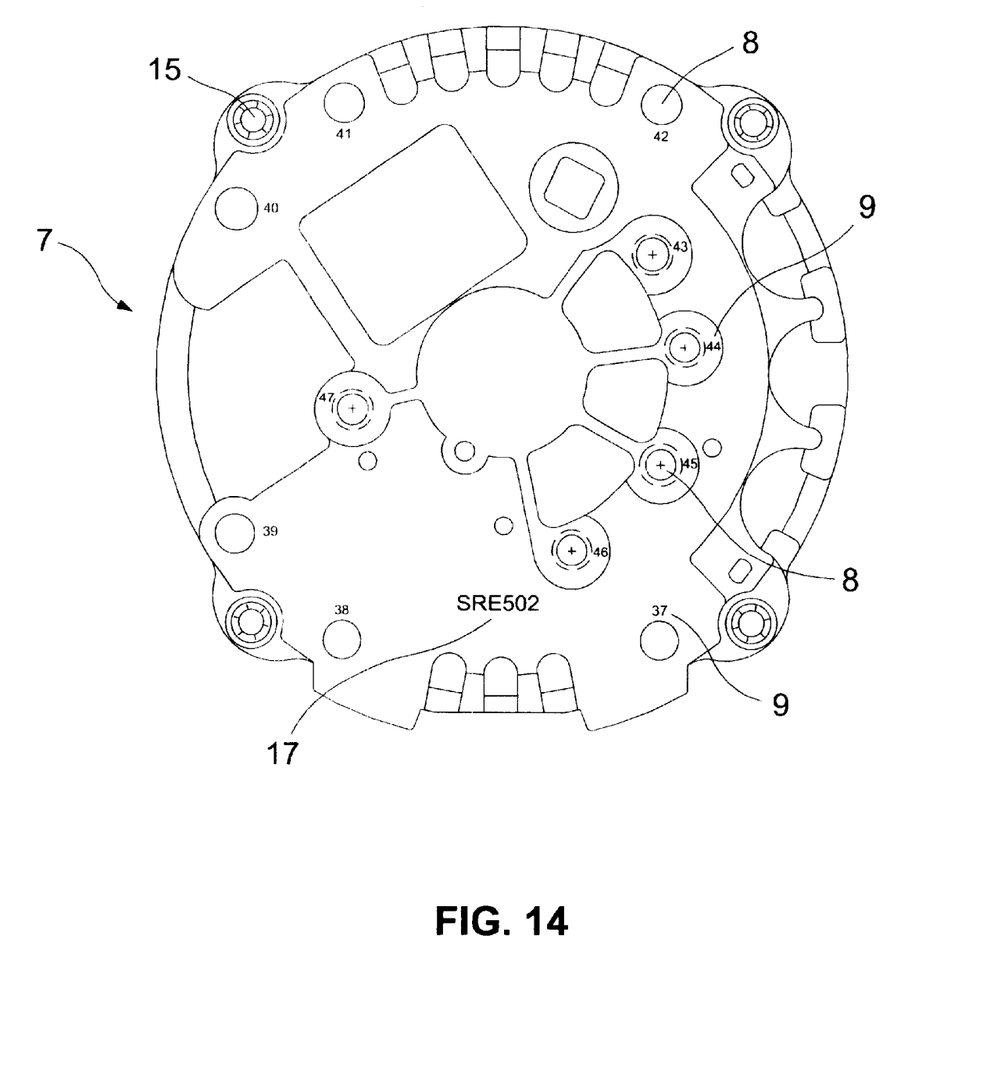
FIG. 14 is a rear view of the present invention, without mounting ears, showing a plurality of frame attachment holes.

Contrasting the unattached mounting ears 3 shown in FIGS. 5 and 7 with the unattached mounting ears 3 in FIGS. 10 and 12 illustrates that a variety of mounting ears 3 can be attached to the periphery of the alternator's end frames 1 and 2. The plurality of frame attachment holes 8 shown in FIGS. 5, 6, 10 and 11 are shown perpendicular to the axis 16 of the alternator. Some frame attachment holes 8 shown in FIG. 14 are parallel to the axis 16 of the alternator and may be tapped to accept threaded bolts (not shown). The plurality of frame attachment holes 8 are particularly located to accommodate the mating and attachment of the various mounting ears 3 and may also mate with the brackets of particular engines (not shown). Other suitable locations would be evident to those skilled in the art.

Referring now to FIGS. 6, 8, 9, 11 and 13 of the present invention, the alternator is shown assembled. Mounting ears 3 are shown mated to the periphery of the end frames 1 and 2 and rigidly attached with fasteners 12 such as bolts, rivets or by other means, either permanently or detachable.

For securing an alternator to a particular engine, the alternator housing is configured by attaching particular mounting ears 3 to specific locations on the periphery of end frames 1 and 2. The FIG. 6 left side view 5 and the FIG. 8 front view 6 shows the assembled alternator having particular mounting ears 3 attached to specific locations on the periphery of end frames 1 and 2 for mounting to a particular engine.

Figure 8:
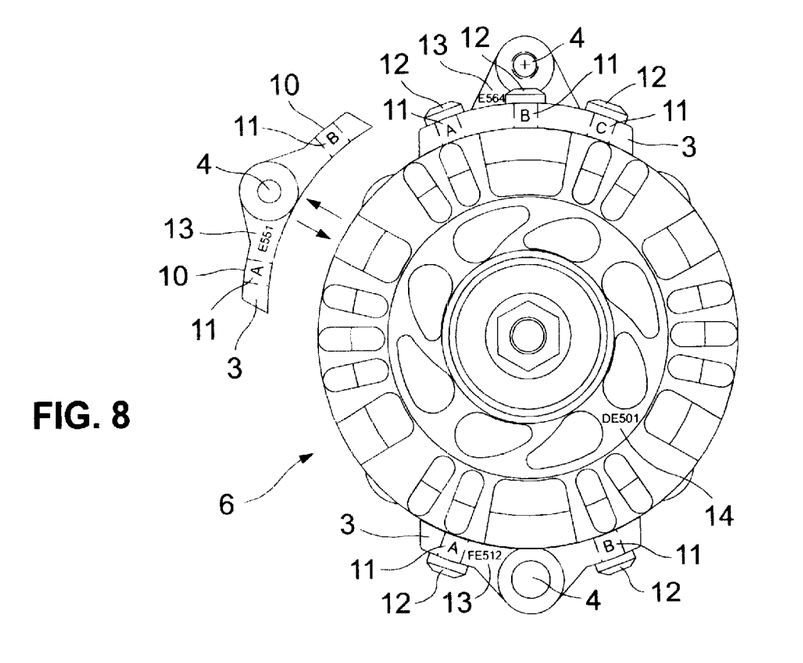
FIG. 8 is a front view of the present invention, showing two of the three mounting ears shown in FIG. 7 attached to the alternator's front end frame.
Figure 9:
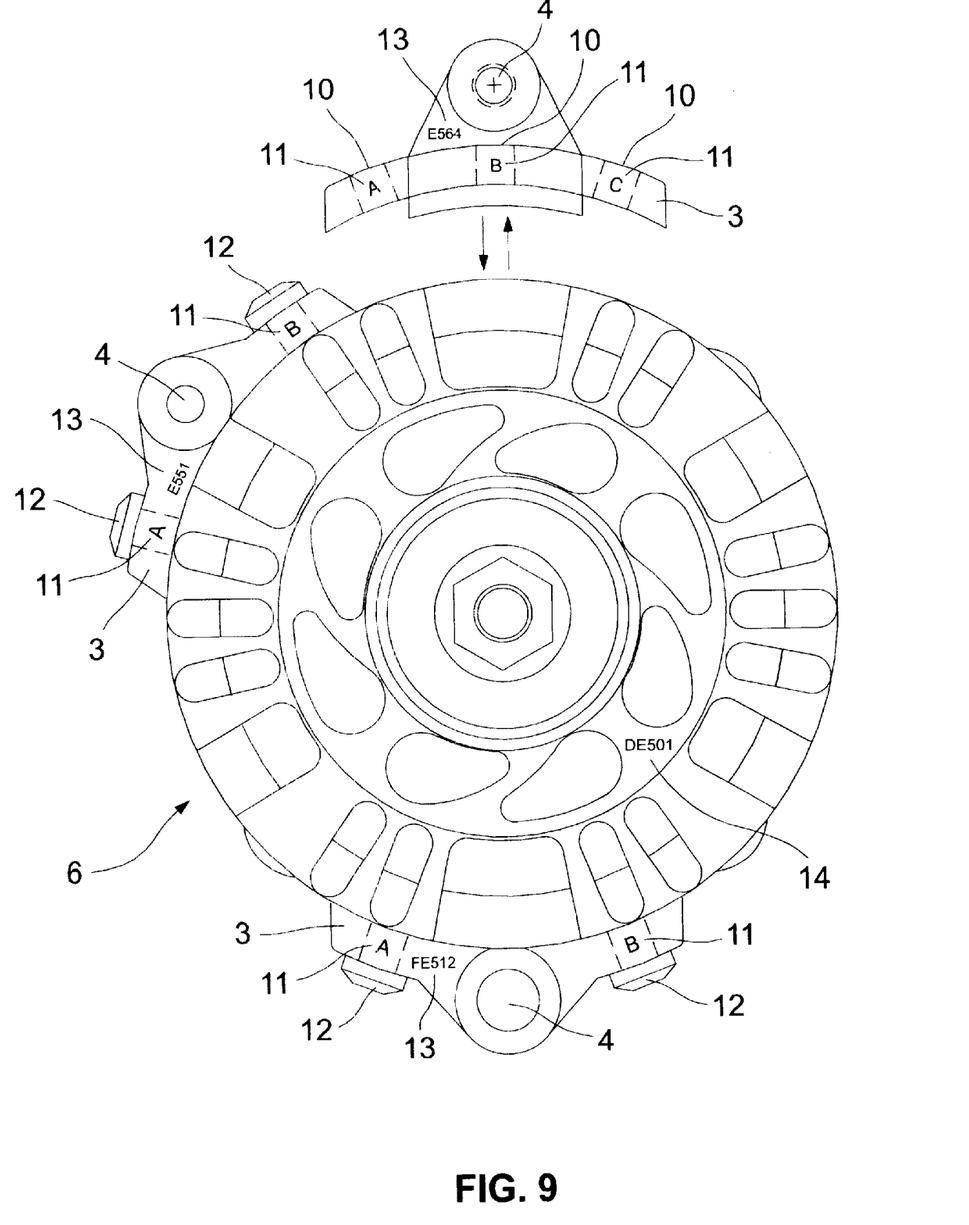
FIG. 9 is a front view of the present invention, showing the top mounting ear shown in FIG. 8 detached and replaced by a different mounting ear and attached in a different position on the alternator's front end frame.

The FIG. 9 front view 6 shows the top mounting ear 3 shown in FIG. 8 having been detached. A different mounting ear 3 is shown attached and also repositioned, resulting in a different alternator configuration to meet the particular requirements for mounting to a different engine. It is to be noted that neither attaching, detaching, replacing nor repositioning mounting ears 3 requires the dismantling of any of the other alternator components.

Figure 13:
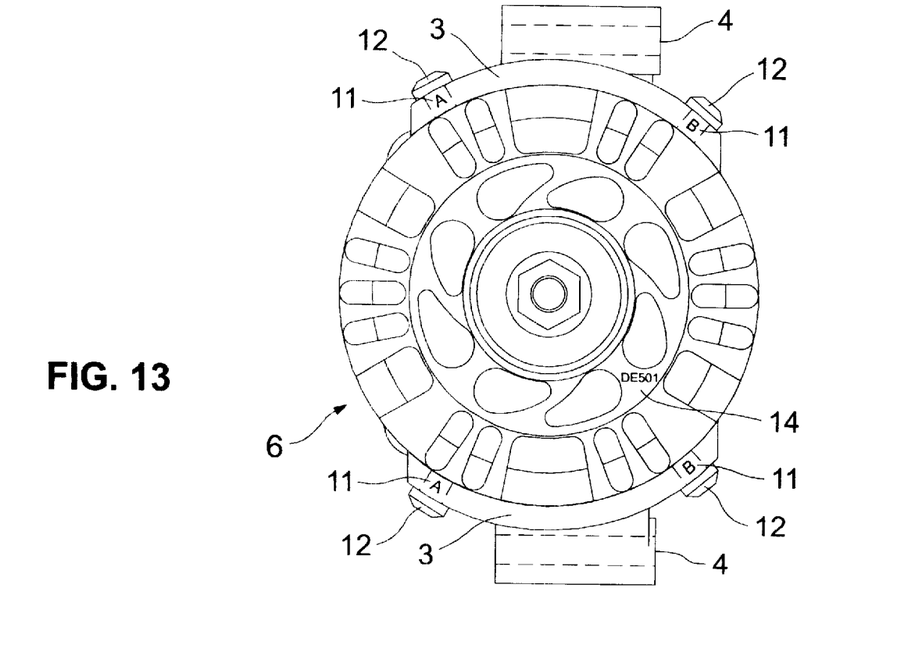
FIG. 13 is the front view of the present invention shown in FIG. 11.

The FIG. 10 left side view 5 shows side mounting ears 3 before attachment to the end frames 1 and 2. In the FIG. 11 left side view 5, the side mounting ears 3 are shown attached to the alternator end frames 1 and 2, and further illustrating a particular alternator configuration to meet the mounting requirements of a particular engine. FIG. 12 shows the front view 6 of the alternator's front end frame 1 and the unattached side mounting ears 3 of the alternator shown in FIG. 10. FIG. 13 shows the front view 6 of the assembled alternator shown in FIG. 11.

Referring now to FIG. 14 of the present invention, the rear view 7 of the back end frame 2 shows a plurality of frame attachment holes 8. Some frame attachment holes 8 are shown tapped to accept threaded bolts (not shown).

It can be seen that including a coherent system of identifications 9, 11, 13, 14 and 17 such as the alpha/numeric system shown in the drawings can facilitate the mating of various mounting ears 3 to the frames 1 and 2.

Although novel embodiments of the invention are described above and shown in the drawings, they are illustrative only. It is intended, therefore, that the invention not be limited to the above embodiments and shown in the drawings. Numerous variations and modifications of the invention can be made without departing from the scope and spirit of what is revealed in the entirety of this document.

What I claim as my invention is:

1. An adjustable attachment alternator assembly of an alternator for motor vehicles, comprising:

a rotor;

a stator;

a stator housing for clamping a stator between two end frames;

a plurality of mounting ears respectively having different predetermined sizes and shapes;

wherein said mounting ears being separately formed, and can be fastened by different fastening means to said end frames at different predetermined locations on a periphery of said enf frames; and, wherein each of said end frames having a plurality of frame-attachement holes; said frame-attachment holes extending from the periphery of said end frames in an inwardly direction substantially perpendicular to the an axis of said alternator, and at at least one of said frame-attachment holes extending from the periphery of said enf frames in an inwardly direction substantially parallel to the axis of said alternator; and, wherein at least one of said plurality of frame-attachment holes having at least one of tapped configuration for accepting threaded bolts and untapped configuration for enabling said mounting ears to be attached to said end frames by said different fastening means; and, wherein said plurality of mounting ears having a plurality of mounting-ear-attachment holes for attaching said mounting ears to said end frames by means of said different fastening means at said different predetermined locations on a periphery of said enf frames; and, wherein at least one of said plurality of mounting-ear-attachment holes having a different diameter and having one configuration of tapped configuration to accept threaded bolts and one of untapped configuration for securing to an engine; and, wherein said stator housing having said plurality of mounting ears being attachable, detachable, replaceable and repositionable to enable a securing configuration of said alternator to be adjustable for securing to different engines; and, wherein said adjustable attachment assembly having one of attachment configurations, including:

said stator housing and said end frames being clamped together and having at least one of said mounting ears attached to said stator housing, and said alternator is configured for securing to an engine;

said stator housing having said end frames being clamped together and having at least one of said mounting ears being detached from said housing and being replaced by at least another one of said mounting ears to enable said alternator to be reconfigured for securing to a different engine.

* * * * *